United States Patent
Ohkubo

Patent Number: 5,717,673
Date of Patent: Feb. 10, 1998

[54] METHOD AND APPARATUS FOR VERIFYING ACCURACY OF DATA WRITTEN ON A PHASE TRANSITION OPTICAL DISK DURING THE WRITING OPERATION

[75] Inventor: Shuichi Ohkubo, Tokyo, Japan

[73] Assignee: NEC Corporation, Tokyo, Japan

[21] Appl. No.: 607,635

[22] Filed: Feb. 27, 1996

[30] Foreign Application Priority Data

Feb. 27, 1995 [JP] Japan ................................ 7-038252

[51] Int. Cl.$^6$ ........................................... G11B 7/00
[52] U.S. Cl. .......................... 369/54; 369/58; 369/13
[58] Field of Search ........................... 369/13, 116, 54, 369/58, 44.31, 121, 100, 59, 124

[56] References Cited

U.S. PATENT DOCUMENTS

| | | | |
|---|---|---|---|
| 4,621,352 | 11/1986 | Kato | 369/54 |
| 4,727,531 | 2/1988 | Ito et al. | 369/58 |
| 5,341,359 | 8/1994 | Birukawa et al. | 369/54 X |
| 5,428,586 | 6/1995 | Kobayashi et al. | 369/13 |
| 5,517,471 | 5/1996 | Ashimuma et al. | 369/13 |

FOREIGN PATENT DOCUMENTS

| | | |
|---|---|---|
| 0 276 808 | 8/1988 | European Pat. Off. . |
| 0 371 880 | 6/1990 | European Pat. Off. . |
| 29024 | 1/1990 | Japan . |
| 341632 | 2/1991 | Japan . |
| 5144112 | 6/1993 | Japan . |

*Primary Examiner*—Thang V. Tran
*Attorney, Agent, or Firm*—Sughrue, Mion, Zinn, Macpeak & Seas, PLLC

[57] ABSTRACT

The writing and reading of optical data is made using an optical data writing medium and a single light spot, and the verification is made simultaneously with the writing of data. A phase transition optical disk is used as the optical data writing medium. The verification is made by checking magnitude of $I_w \times (P_r/P_w)$ and that of $I_r$, wherein $I_w$ is a return light dose from the optical data writing medium during writing, $I_r$ is a return light dose from the optical data writing medium in a crystal state of the writing film, $P_w$ is laser power during writing, and $P_r$ is laser power during reading. The device for writing and reading optical data includes a divider for dividing a return light dose $I_w$ from the optical data writing medium during writing by $P_w/P_r$, and a comparator for judging magnitude of $I_w \times (P_r/P_w)$ and that of a return light dose from the optical data writing medium. The verification by a single beam spot while data is being written enables the reduction of writing time.

2 Claims, 3 Drawing Sheets

METHOD AND APPARATUS FOR VERIFYING ACCURACY OF DATA WRITTEN ON A PHASE TRANSITION OPTICAL DISK DURING THE WRITING OPERATION

BACKGROUND OF THE INVENTION

(1) Field of the Invention

The present invention relates to a method of and a device for writing and reading optical data on an optical data writing medium (hereinafter referred to as optical disk), and more particularly to a method of and a device for writing and reading data by using a phase transition medium.

(2) Description of the Related Art

In an optical disk device, data is written on an optical disk by irradiating the disk with a laser beam. The irradiation of the optical disk with the laser beam results in a local temperature rise in a writing film of the optical disk due to light absorption. The local temperature rise causes changes in the state of the writing film, thus enabling the writing.

In the optical disk device, it is necessary, during the signal writing, to verify whether the writing data has been correctly written on the optical disk. In a prior art optical disk device, which is commercially available at present, the verification of writing data is made by reading the written area after the writing. In other prior art examples, a plurality of light sources are used, or a plurality of beam spots formed by diffraction grating are used, as disclosed in Japanese Patent Application Kokai Publication No. Hei 2-9024 or Japanese Patent Application Kokai Publication No. Hei 3-41632, whereby one or more beam spots are used for the verification. With respect to a magneto-optical disk, there is a proposal as disclosed in Japanese Patent Application Kokai Publication No. Hei 5-144112 in which a single beam verification using a single beam spot, is realized by utilizing characters unique or inherent to an opto-magnet.

In the prior art verification methods applied to the optical disk devices described above, there have been problems that, in the case where the verification is made after the writing operation, the time required for the writing is extended. In the case where a plurality of beam spots are used, there have been problems that the cost is high and the adjustment of optical system is difficult. With the phase transition type optical disks in which the writing and reading principles are different from those in the magneto-optical disk, a method for realizing a single beam verification using a single beam spot verification has not heretofore been known.

SUMMARY OF THE INVENTION

An object of the invention, therefore, is to overcome the problems existing in the prior art, and to provide a method of and device for writing and reading optical data, which can verify the data written on a phase transition optical disk with a single light beam spot simultaneously with a writing operation.

To attain this object, the method of and device for writing and reading optical data using a phase transition optical disk according to the invention, is featured in that the verification is made by using a writing/reading laser beam while writing is made, and that verification with a single laser beam is made through comparison of the return light dose $I_w$ from the optical disk during the writing and the return light dose $I_r$ from the optical disk while the writing film is in the crystal state.

The device for writing and reading optical data according to the invention is featured in the provision of a divider for dividing the return light dose $I_w$ during the writing by $P_w/P_r$ wherein $P_w$ is the laser power during the writing and $P_r$ is the laser power during the reading, and a comparator for judging magnitude of $I_w \times (P_r/P_w)$ and that of the return light dose $I_r$ from the optical disk in the crystal state of the writing film.

With the phase transition optical disk, data is written and read by utilizing the reversible phase transition of the disk between the crystal state and the amorphous state. For writing, the writing film melts due to irradiation with the writing power $P_w$ and then cooled down quickly to make it amorphous. The optical constants of the writing film in the melted state are different from those in the crystal state or the amorphous state. Thus, it is possible to verify whether the writing film has melted, that is, whether the proper writing has been made, by monitoring the return light dose $I_w$ during the writing from the optical disk and comparing the return light dose $I_w$ with a reference value. Assuming that the reflectivities of the optical disk when the writing film is in the crystal state, melted state and amorphous state are respectively $R_c$, $R_m$ and $R_a$, a relation, $R_m < R_c$, is satisfied in the case where a medium structure is $R_c > R_a$, and a relation, $R_m > R_c$, is satisfied in the case where a medium structure is $R_c < R_a$. In either case, verification as to whether the writing film has melted, that is, whether the proper writing has been obtained, can be obtained from the check of the magnitude relation between $R_m$ and $R_c$. The return light dose $I_w$ from the writing disk during the writing is $I_w = P_w \times R_m$ where $P_w$ is the laser power during the writing. On the other hand, the return light dose $I_r$ from the optical disk during the reading in the crystal state of the writing film is $I_r = P_r \times R_c$ wherein $P_r$ is the laser power during the reading. A check as to whether the writing film has melted so as to satisfy a relation, for example, $R_m < R_c$, thus may be made by checking whether a relation, $I_w/P_w < I_r/P_r$, has been satisfied. From the result of this check, verification as to whether the proper writing has been made can be obtained.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, a preferred embodiment of the invention will be described with reference to the drawings.

Figure 1:
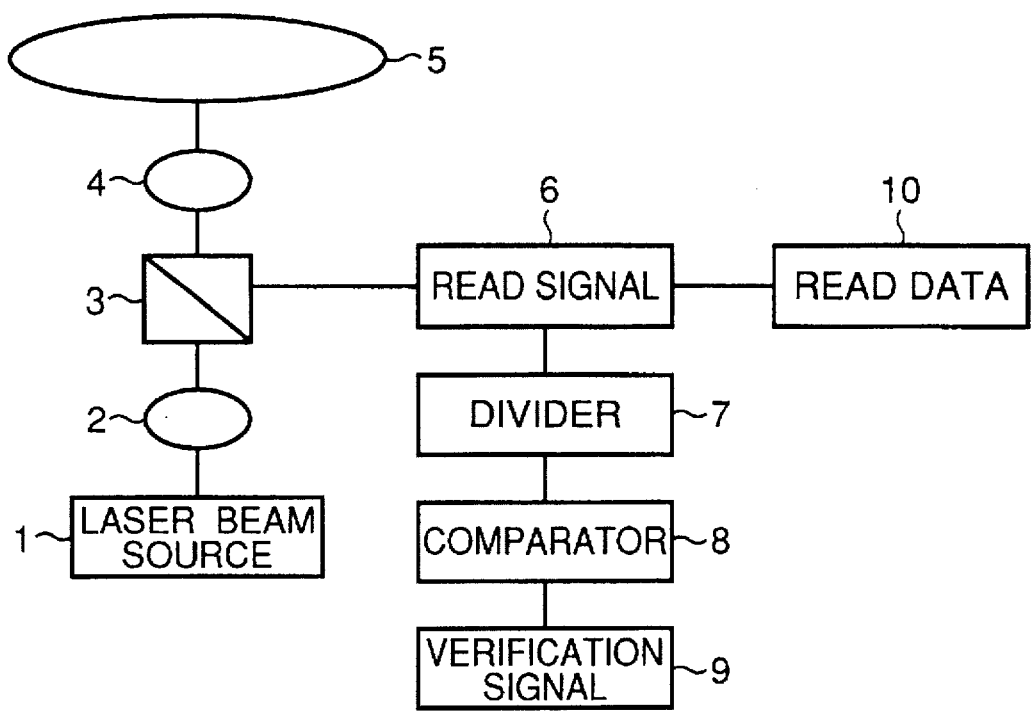
FIG. 1 is a schematic representation of an optical system for describing an embodiment of the invention applied to the method of and device for writing and reading optical data.

FIG. 1 schematically shows an optical system of an embodiment of the invention applied to the method of and device for writing and reading optical data according to the invention.

The writing and reading device embodying the invention comprises a laser beam source 1, lenses 2 and 4, a beam splitter 3, a phase transition optical disk 5, a divider 7, and a comparator 8. The numeral 6 denotes a read signal, 9 denotes a verification signal, and 10 denotes a read data.

The operation of the embodiment will now be described.

A laser beam emitted from the laser beam source 1 and having a predetermined intensity, is converted by the lens 2 to a parallel beam, passes through the beam splitter 3 and the converging lens 4 and is focused on the phase transition optical disk 5. In writing, data is written with laser power $P_w$. In reading, the written data is read with laser power $P_r$, and passes through the lens 4 and beam splitter 3 to be detected as the read signal 6 to be output as the read data 10. In the writing operation, the read signal $I_w$ detected during the writing operation is divided by $P_w/P_r$ ($P_w$ being the laser power being writing and $P_r$ being the laser power during the reading), and the quotient of the division is compared in the comparator 8 with the return light dose $I_r$ from the phase transition optical disk 5 in the crystal state of the writing film during the writing. The result of the comparison is output as the verification signal 9.

Figure 2:
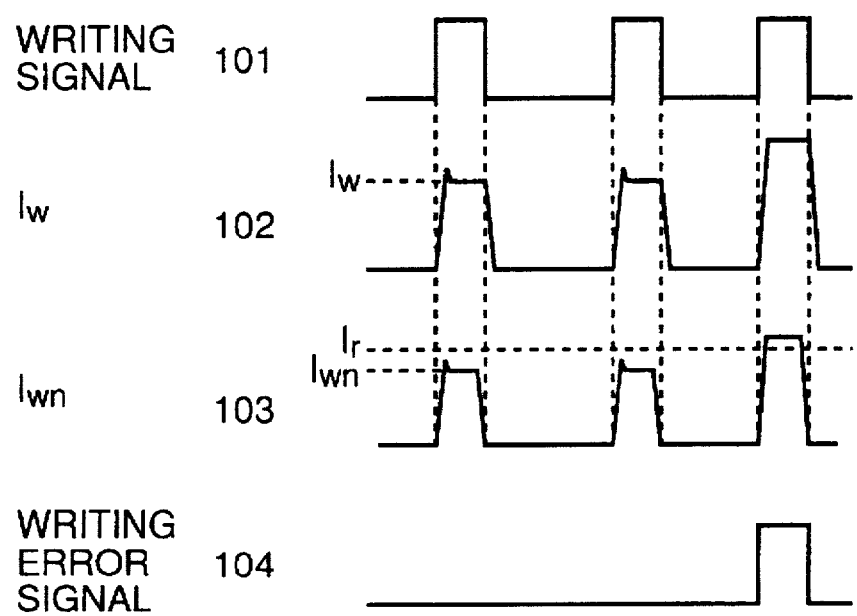
FIG. 2 is a waveform chart illustrating the verifying operation in the method of and device for writing and reading optical data shown in FIG. 1.

FIG. 2 is a waveform chart schematically illustrating the verifying operation during the writing and reading device shown in FIG. 1. Shown by 101 is a writing signal, 102 the return light dose $I_w$ from the phase transition optical disk 5 shown in FIG. 1 during the writing, and by 103 the quotient $I_{wn}$ of division of $I_w$ by $P_w/P_r$. The levels of the return light dose $I_r$ from the phase transition optical disk 5 when the writing film is in the crystal state and $I_{wn}$ are compared. When $I_{wn} > I_r$, a writing error signal as shown by 104 is generated, which indicates that the proper writing has failed. Without detection of any writing error signal, it is verified that the proper writing has been obtained.

Examples of application of this embodiment of the method of and device for writing and reading optical data according to the invention will now be described with reference to the drawings.

EXAMPLE 1

Figure 3:
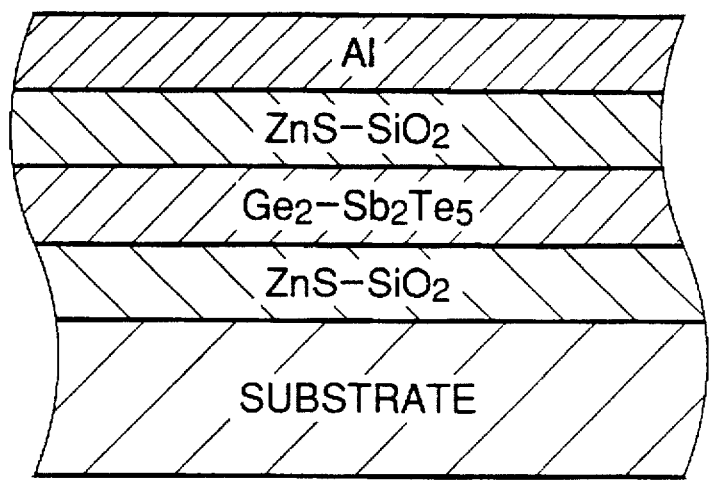
FIG. 3 is a partial sectional view showing an example of the composition of the phase transition optical disk used for the method of and device for writing and reading optical data shown in FIG. 1.

A phase transition optical disk having a structure as shown in FIG. 3 was used, which was obtained by depositing ZnS—SiO$_2$ to 150 nm, Ge$_2$Sb$_2$Te$_5$ to 20 nm, ZnS—SiO$_2$ to 20 nm and Al to 60 nm successively by spattering on a polycarbonate substrate. On the optical disk, (2–7) modulated random data was written by rotating the disk at a linear speed of 7.5 m/s and setting the writing pulse width to 50 ns. The writing power $P_w$ was set to 14 to 16 mW, the erasing power $P_e$ was set to 7 mW, and the reading power $P_r$ was set to 1 mW.

Figure 4:
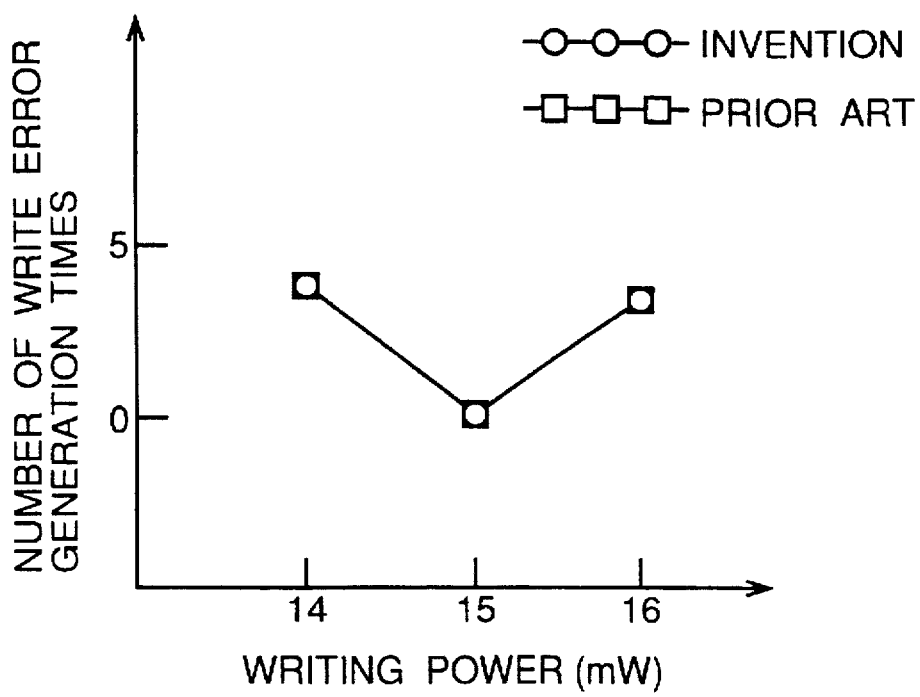
FIG. 4 is a graph showing an example of the relation between the number of write error generation times and the writing power in the method of and device for writing and reading optical data shown in FIG. 1.

The reflectivities of the writing film were 25%, 10% and 8% when the film was in the crystal state, melted state and amorphous state, respectively. The return light dose $I_r$ from the optical disk in the crystal state of the writing film during the reading, was 1.5 V, and the writing error signal was generated while the light dose level as a result of division of the light dose $I_w$ of the optical disk during the writing by $P_w/P_r$ was higher than 1.5 V. FIG. 4 shows the relation between the number of write error generation times and the writing power during the writing. FIG. 4 also shows, as a comparison, the result of checking of write errors by reading the written area after the writing as in the prior art. As is obvious from FIG. 4, the detected number of write error generation times in this example is in accord with that in the prior art example.

EXAMPLE 2

A phase transition optical disk having a structure as shown in FIG. 3 was used, which was obtained by laminating ZnS—SiO$_2$ to 100 nm, Ge$_2$Sb$_2$Te$_5$ to 25 nm, ZnS—SiO$_2$ to 20 nm and Al to 60 nm successively by sputtering on a polycarbonate substrate. On this optical disk, (2–7) modulated random data was written by rotating the disk at a linear speed of 7.5 m/s and setting the writing pulse width of 50 ns. The writing power $P_w$ was set to 16 to 18 mW, the erasing power $P_e$ was set to 8 mW, and the reading power $P_r$ was set to 1 mW.

Figure 5:
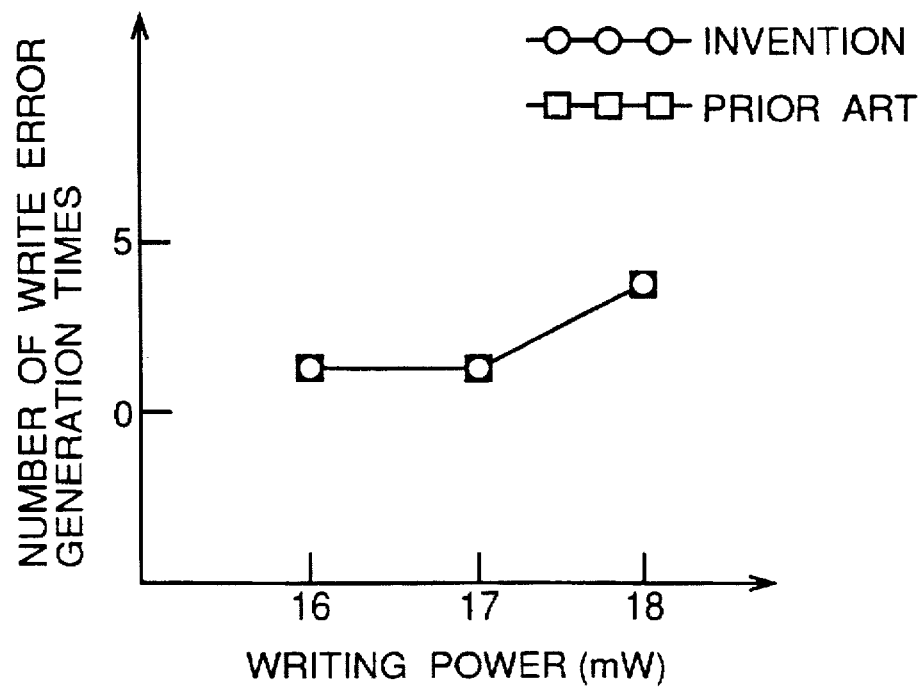
FIG. 5 is a graph showing a different example of the relation between the number of write error generation times and the writing power in the method of and device for writing and reading optical data shown in FIG. 1.

The reflectivities of the writing film were 20%, 8% and 6% when the film was in the crystal state, melted state and amorphous state, respectively. The return light dose $I_r$ from the disk in the crystal state of the writing film during the reading was 1.2 V, and the writing error signal was generated while the dose as a result of division of the return light amount $I_w$ from the optical disk during the writing by $P_w/P_r$ was higher than 1.2 V. FIG. 5 shows the relation between the number of write error generation times during the writing and the writing power. FIG. 5 also shows, as a comparison, the result of checking write errors by reading the written area after writing as in the prior art. As is obvious from FIG. 5, the number of write error generation times detected in this example is in accord with that in the prior art example.

It will be seen that in this example it is possible to verify the contents of the writing data by using the writing laser beam while data is written.

EXAMPLE 3

Figure 6:
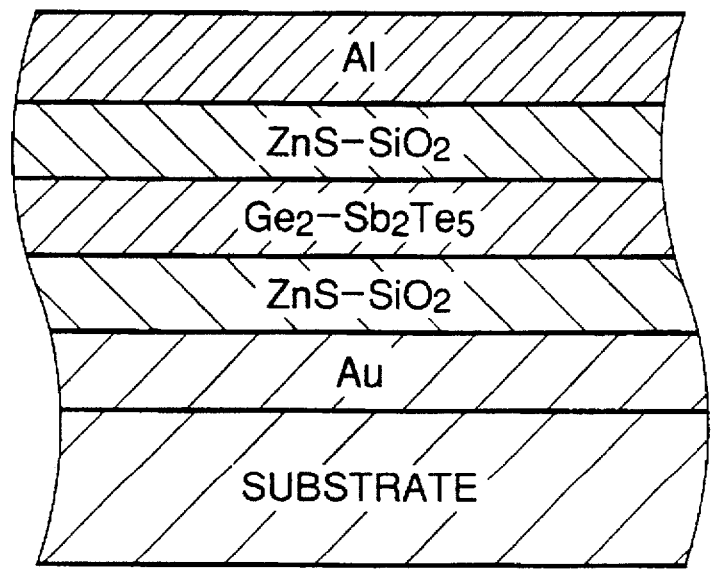
FIG. 6 is a partial sectional view showing a different example of the composition of phase transition optical disk used for the method of and device for writing and reading optical data shown in FIG. 1.

A phase transition optical disk having a structure as shown in FIG. 6 was used, which was obtained by laminating Au to 10 nm, ZnS—SiO$_2$ to 150 nm, Ge$_2$Sb$_2$Te$_5$ to 20 nm, ZnS—SiO$_2$ to 45 nm and Al to 100 nm successively by sputtering on a polycarbonate substrate. On this optical disk, (2–7) modulated random data was written by rotating the disk at a linear speed of 7.5 m/s and setting the writing pulse width to 50 ns. The writing power $P_w$ was set to 18 to 20 mW, the erasing power $P_e$ was set to 9 mW, and the reading power $P_r$ was set to 1 mW.

The medium structure was such that the reflectivity was higher in the amorphous state. The reflectivities of the writing film were 10%, 25% and 30% when the film was in the crystal state, melted state and amorphous state, respectively. The return dose $I_r$ from the optical disk in the crystal state of the writing film during the reading was 0.6 V, and the writing error signal was generated while the light dose as a result of division of the return light dose $I_w$ from the optical disk during the writing by $P_w/P_r$ was higher than 0.6 V. The relation between the number of write error generation times and the writing power was checked, and it was confirmed that the same results as in the prior art example could be obtained in the same way as in Examples 1 and 2.

As shown, in this example verification can be obtained with a single beam spot of laser beam for writing while the writing is made.

As has been described in the foregoing, with the method of and device for writing and reading optical data according to the invention, verification of the writing data can be obtained with a single beam spot while data is written. Thus, the time necessary for writing can be reduced. In addition, since it is not necessary to use a plurality of beams spots, complicated adjustment of optical system is unnecessary, so that it is possible to reduce cost.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method of writing and reading optical data using an optical data writing medium having a writing film in which one of reflectivity and optical phase is variable depending on light irradiation, said method comprising the steps of:

writing and reading data with a single light spot;

dividing a return light dose $I_w$ from said optical data writing medium by a predetermined value to obtain a quotient value; and verifying, simultaneously with the writing of the data, whether said data has been correctly written on said optical data writing medium based upon said quotient value wherein said verifying step includes the steps of:

checking a magnitude of said quotient of $I_w$ divided by said predetermined value, said predetermined value corresponding to $(P_w/P_r)$ and said quotient corresponding to $I_w \times (P_r/P_w)$, and that of $I_r$, wherein $I_r$ is a return light dose from said optical data writing medium in a crystal state of the writing film, $P_w$ is a laser power during writing, and $P_r$ is a laser power during reading.

2. A device for writing and reading optical data using an optical data writing medium having a writing film in which one of reflectivity and optical phase is variable depending on light irradiation, said device comprising:

a light source for irradiating a beam of light onto said optical data writing medium;

a divider for dividing a return light dose $I_w$ reflected from said optical data writing medium during writing by $P_w/P_r$ to obtain a quotient value, wherein $P_w$ is laser power during writing and $P_r$ is laser power during reading; and a comparator for comparing a magnitude of $I_w \times (P_r/P_w)$ and that of a return light dose from said optical data writing medium in a crystal state of the writing film to determine the accuracy of said optical data written on said optical data writing medium.

* * * * *